US012597021B2

(12) United States Patent
Lu et al.

(10) Patent No.: US 12,597,021 B2
(45) Date of Patent: *Apr. 7, 2026

(54) SYSTEM AND METHOD FOR CRYPTOGRAPHIC-CHAIN-BASED VERIFICATION OF POSTAGE TRANSACTION RECORDS

(71) Applicant: Stamps.com Inc., El Segundo, CA (US)

(72) Inventors: Yang Lu, Los Angeles, CA (US); Michael Biswas, Culver City, CA (US)

(73) Assignee: Auctane, Inc., Austin, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/642,686

(22) Filed: Apr. 22, 2024

(65) Prior Publication Data

US 2025/0307802 A1 Oct. 2, 2025

Related U.S. Application Data

(63) Continuation of application No. 15/633,692, filed on Jun. 26, 2017, now Pat. No. 11,966,912.

(51) Int. Cl.
*G06Q 20/38* (2012.01)

(52) U.S. Cl.
CPC ..... *G06Q 20/382* (2013.01); *G06Q 20/38215* (2013.01); *G06Q 20/3823* (2013.01); *G06Q 20/3825* (2013.01); *G06Q 2250/05* (2013.01)

(58) Field of Classification Search
CPC ........... G06Q 20/382; G06Q 20/38215; G06Q 20/3823; G06Q 20/3825; G06Q 2250/05;

(Continued)

(56) References Cited

U.S. PATENT DOCUMENTS 5,671,279 A * 9/1997 Elgamal .................. H04L 63/12
 705/75
5,809,144 A * 9/1998 Sirbu ................... G06Q 20/123
 705/75

(Continued)

FOREIGN PATENT DOCUMENTS

EP 1247258 B1 8/2010

OTHER PUBLICATIONS

Satoshi Nakamoto, Bitcoin: A Peer-to-Peer Electronic Cash System, Oct. 31, 2008, https://bitcoin.org/bitcoin.pdf (Year: 2008).*

(Continued)

*Primary Examiner* — Yingying Zhou

(57) ABSTRACT

In certain embodiments, cryptographic-chain-based verification of postage transaction records may be facilitated. In some embodiments, a customer computer system may obtain a customer private key associated with a customer from a secure local storage at the customer computer system. The customer computer system may obtain (i) a first vendor digital signature derived from a first postage transaction record and (ii) a second postage transaction record. The customer computer system may create a customer digital signature based on (i) the customer private key, (ii) the first vendor digital signature, and (iii) the second postage transaction record. The customer computer system may provide the customer digital signature to a vendor computer system associated with the postage vendor, and, in response, obtain a second vendor digital signature from the vendor computer system, wherein the second vendor digital signature is based on (i) a vendor private key associated with the postage vendor and (ii) the customer digital signature.

20 Claims, 4 Drawing Sheets

(58) Field of Classification Search

CPC . H04L 9/14; H04L 9/3247; H04L 9/50; H04L 2209/56; H04L 9/3239; H04L 63/123

See application file for complete search history.

(56) References Cited

U.S. PATENT DOCUMENTS

| | | | | |
|---|---|---|---|---|
| 6,076,078 A * | 6/2000 | Camp | ..... | G06Q 20/045 |
| | | | | 380/268 |
| 6,438,530 B1 * | 8/2002 | Heiden | ..... | G07B 17/0008 |
| | | | | 705/401 |
| 6,820,202 B1 * | 11/2004 | Wheeler | ..... | G06Q 20/3829 |
| | | | | 713/185 |
| 7,093,130 B1 * | 8/2006 | Kobayashi | ..... | H04L 63/12 |
| | | | | 713/168 |
| 7,203,666 B1 * | 4/2007 | Gravell | ..... | G07B 17/00435 |
| | | | | 705/401 |
| 7,383,194 B2 * | 6/2008 | Heiden | ..... | G07B 17/0008 |
| | | | | 705/401 |
| 8,396,810 B1 * | 3/2013 | Cook | ..... | G06Q 20/3572 |
| | | | | 705/67 |
| 2001/0037735 A1 * | 11/2001 | Lee | ..... | G07B 17/00193 |
| | | | | 101/91 |
| 2002/0077990 A1 * | 6/2002 | Ryan, Jr. | ..... | G07B 17/00314 |
| | | | | 705/60 |
| 2002/0178354 A1 | 11/2002 | Ogg et al. | | |
| 2003/0097561 A1 * | 5/2003 | Wheeler | ..... | G06Q 20/3823 |
| | | | | 713/168 |
| 2003/0145205 A1 * | 7/2003 | Sarcanin | ..... | G06Q 20/382 |
| | | | | 713/172 |
| 2006/0069655 A1 | 3/2006 | Athens et al. | | |
| 2007/0073628 A1 | 3/2007 | Pauly et al. | | |
| 2012/0072732 A1 | 3/2012 | Canard et al. | | |
| 2012/0131348 A1 * | 5/2012 | Skubic | ..... | H04L 63/08 |
| | | | | 713/176 |
| 2013/0185214 A1 * | 7/2013 | Azen | ..... | G06Q 20/3272 |
| | | | | 705/76 |
| 2019/0147438 A1 * | 5/2019 | Micali | ..... | G06Q 20/4016 |
| | | | | 705/71 |

OTHER PUBLICATIONS

Extended European Search Report issued in corresponding European Patent Application No. 18825381.9, dated Feb. 11, 2021.

Communication issued in corresponding European Patent Application No. 18825381.9, dated Mar. 2, 2021.

Voegtlin, Thomas: "Multisig Wallets", Mar. 29, 2017, retrieved from Internet Feb. 3, 2021: URL:hltps://web.archive.org/web/20170329020602/hltps://electrum.readthedocsjo/en/latest/multisig.htm/retrieved on Feb. 3, 2021].

White Paper: "Digital Assets on Public Blockchains", BitFury Group Limited, Mar. 15, 2016.

"Ron White, How Computers Work, 2003, QUE, 7th" (Year: 2003).

International Preliminary Report on Patentability issued in corresponding International Application No. PCT/US2018/039015 on Jan. 9, 2020; (9 pages).

International Search Report and Written Opinion of the International Searching Authority issued in related International Patent Application No. PCT/US2018/039015 on Oct. 26, 2018; (12 pages).

* cited by examiner

First-Entity System

Second-Entity System

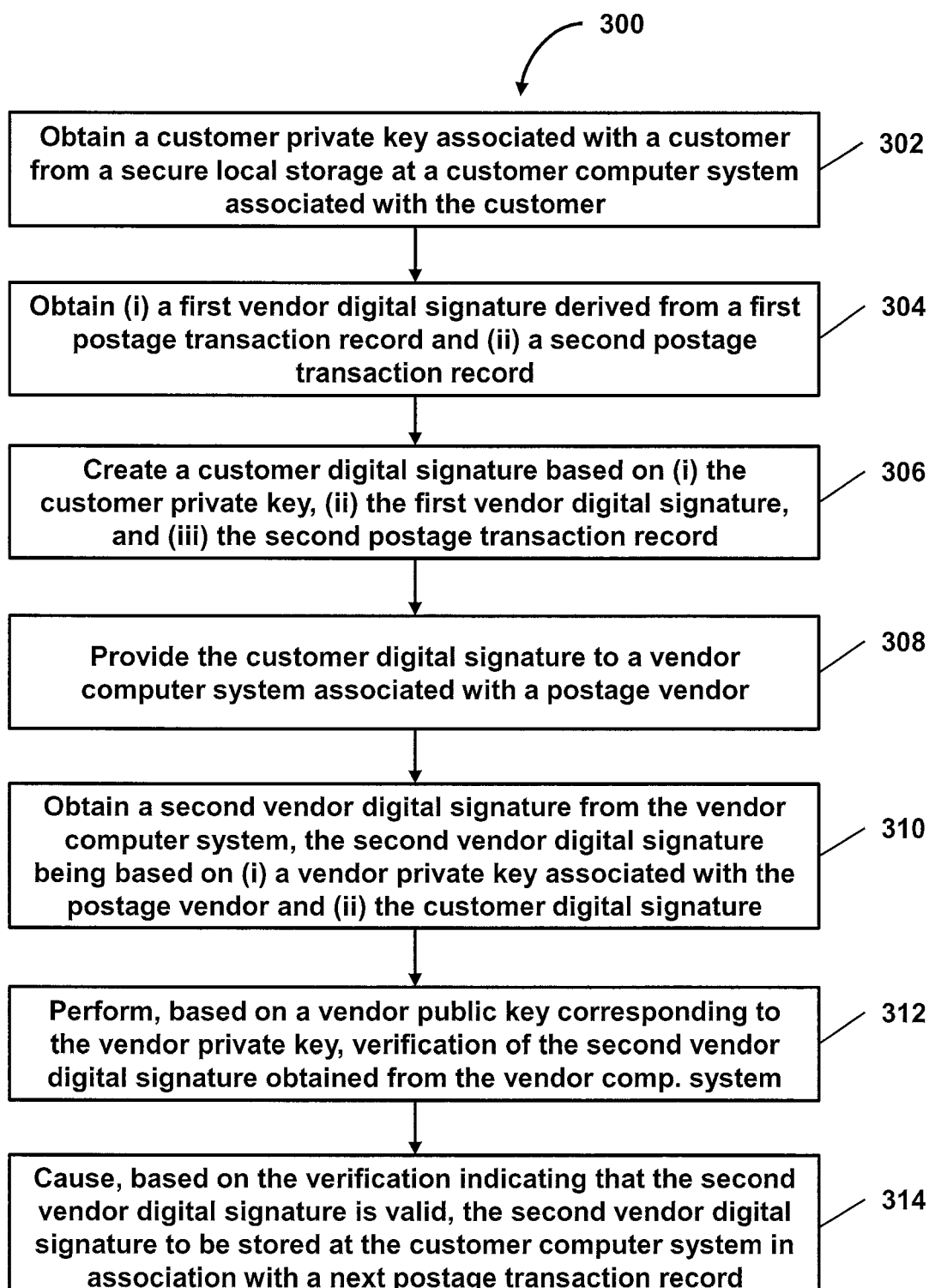

300

Obtain a customer private key associated with a customer from a secure local storage at a customer computer system associated with the customer          302

Obtain (i) a first vendor digital signature derived from a first postage transaction record and (ii) a second postage transaction record          304

Create a customer digital signature based on (i) the customer private key, (ii) the first vendor digital signature, and (iii) the second postage transaction record          306

Provide the customer digital signature to a vendor computer system associated with a postage vendor          308

Obtain a second vendor digital signature from the vendor computer system, the second vendor digital signature being based on (i) a vendor private key associated with the postage vendor and (ii) the customer digital signature          310

Perform, based on a vendor public key corresponding to the vendor private key, verification of the second vendor digital signature obtained from the vendor comp. system          312

Cause, based on the verification indicating that the second vendor digital signature is valid, the second vendor digital signature to be stored at the customer computer system in association with a next postage transaction record          314

FIG. 3

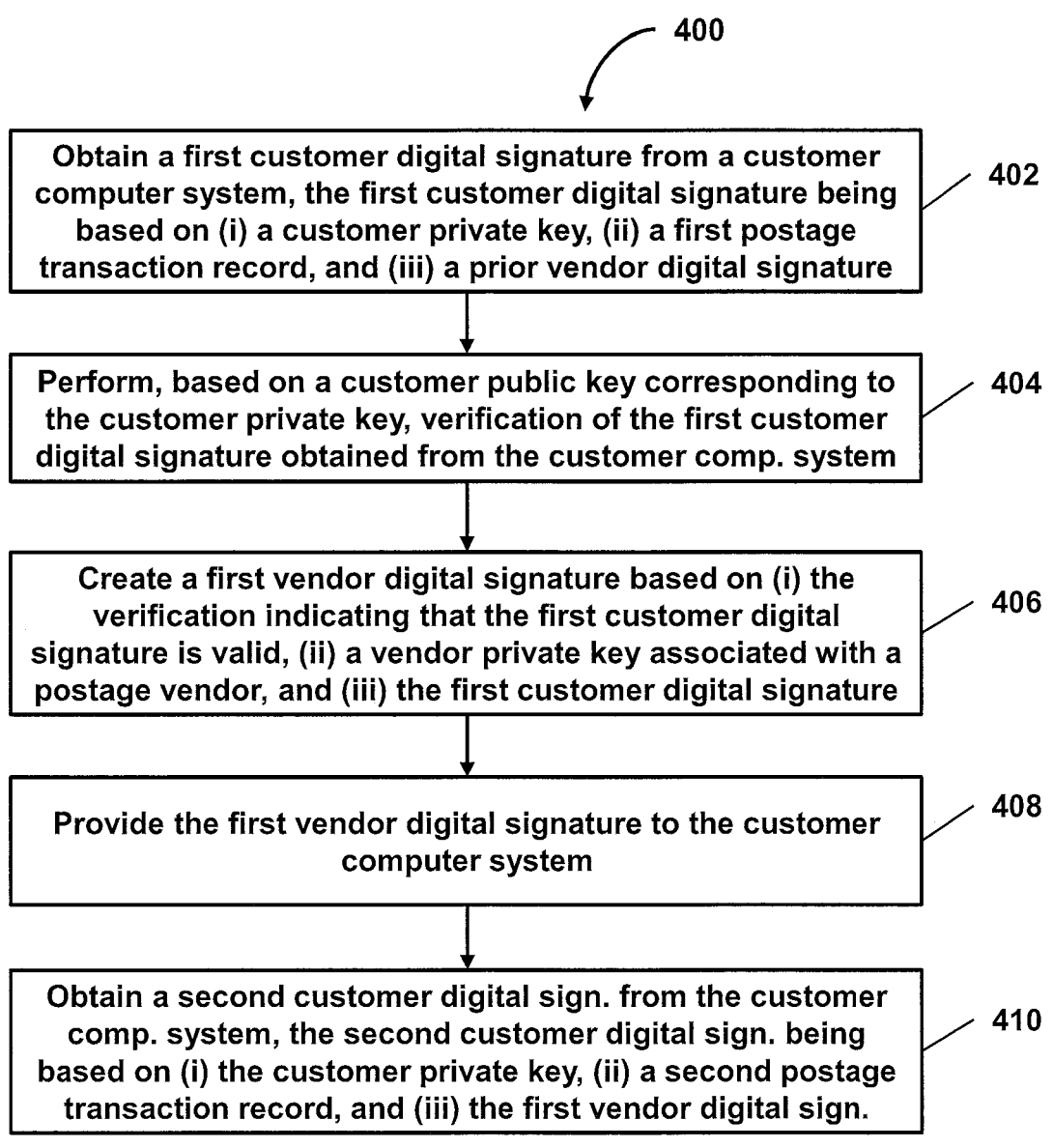

400

Obtain a first customer digital signature from a customer computer system, the first customer digital signature being based on (i) a customer private key, (ii) a first postage transaction record, and (iii) a prior vendor digital signature — 402

Perform, based on a customer public key corresponding to the customer private key, verification of the first customer digital signature obtained from the customer comp. system — 404

Create a first vendor digital signature based on (i) the verification indicating that the first customer digital signature is valid, (ii) a vendor private key associated with a postage vendor, and (iii) the first customer digital signature — 406

Provide the first vendor digital signature to the customer computer system — 408

Obtain a second customer digital sign. from the customer comp. system, the second customer digital sign. being based on (i) the customer private key, (ii) a second postage transaction record, and (iii) the first vendor digital sign. — 410

FIG. 4

SYSTEM AND METHOD FOR CRYPTOGRAPHIC-CHAIN-BASED VERIFICATION OF POSTAGE TRANSACTION RECORDS

This application is a continuation of U.S. patent application Ser. No. 15/633,692, filed on Jun. 26, 2017, now U.S. Pat. No. 11,966,912, which is herein incorporated by reference in its entirety.

FIELD OF THE INVENTION

The invention relates to computer-based verification of postage transaction records, including, for example, cryptographic-chain-based verification of postage transaction records.

BACKGROUND OF THE INVENTION

Traditional postage vendor computer systems of postage vendors for the United States Postal Service (USPS) or other postal carriers generally require that their customers' computer systems (e.g., merchants, shippers, or other entities) communicate with the vendor computer systems for each postage print transaction (or other postage transactions) to ensure the integrity of the postage transactions. As an example, in a typical scenario to satisfy a certain level of postage transaction data integrity, a vendor computer system generally will maintain postage meters of a customer (e.g., a reseller of a postage vendor or other customer of the postage vendor) at the postage vendor's physical site, and a customer computer system is required to transmit information regarding each print transaction and a valid customer digital signature for the print transaction information to a vendor computer system in order to complete the print transaction. Upon obtaining the information, the vendor computer system must verify the data integrity of the print transaction information (e.g., by verifying the customer digital signature as a valid digital signature for the print transaction information) and, if valid, modifies the values of the appropriate registers of the customer's postage meter accordingly. The vendor computer system then creates or updates its postage transaction records associated with the customer, and subsequently sends these transaction records to the appropriate postal carrier (e.g., USPS or other postal carrier). The foregoing scenario, however, prevents or delays a print transaction from being completed in a number of circumstances, including, for example, when the vendor computer system is down, when network nodes between the vendor computer system and the customer computer system are down, when the connection between the two computer systems is limited in bandwidth, or other circumstances. These and other drawbacks exist.

SUMMARY OF THE INVENTION

Aspects of the invention relate to methods, apparatuses, and/or systems for facilitating "cryptographic chaining" of postage transaction records (or other records) and cryptographic-chain-based verification of such records.

In some embodiments, a customer computer system (sending a postage transaction record of one or more transactions to a vendor computer system) may create a new cryptographic item (e.g., a customer digital signature) related to the postage transaction record based on (i) a private key (e.g., stored in a secure local storage at the customer computer system or other secure storage, associated with a customer of a postage vendor, etc.), (ii) the postage transaction record, and (iii) a cryptographic item (e.g., a prior vendor digital signature) previously derived (by the vendor computer system) from a prior transaction record sent from the customer computer system. In some embodiments, the customer computer system may provide as inputs to a cryptographic function (i) the private key as a signing key and (ii) the postage transaction record and the previously-derived cryptographic item as at least part of the combined content to be signed with the private key. In response to the foregoing inputs, the cryptographic function may output the new cryptographic item, which is derived from the private key, the postage transaction record, and the previously-derived cryptographic item. Upon the new cryptographic item being provided to the vendor computer system, the vendor computer system may perform verification of the postage transaction record (e.g., by verifying the new cryptographic item) by determining whether the new cryptographic item is "cryptographically chained" to a particular previously-created cryptographic item (e.g., the cryptographic item derived, by the vendor computer system, from the prior transaction record). If, for instance, it is determined that the new cryptographic item is "chained" to the previously-derived cryptographic item, the verification may indicate that the postage transaction record is valid. In this way, for example, the data integrity of transaction records may be protected (e.g., from man-in-the-middle attacks) and easily verifiable—other entities can use the known corresponding public keys to verify whether the postage transaction records have been compromised. In addition, because the transaction records are chained via their cryptographic items (e.g., digital signatures), a further layer of security is provided—e.g., if only the customer private key is compromised, an attacker or other such entity would still not be able to produce a valid customer digital signature without the correct prior vendor digital signature (e.g., the last vendor digital signature provided by the vendor computer system for the customer).

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 3 shows a flowchart of a method of facilitating cryptographic-chain-based verification of postage transaction records, in accordance with one or more embodiments.

FIG. 4 shows another flowchart of a method of facilitating cryptographic-chain-based verification of postage transaction records, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
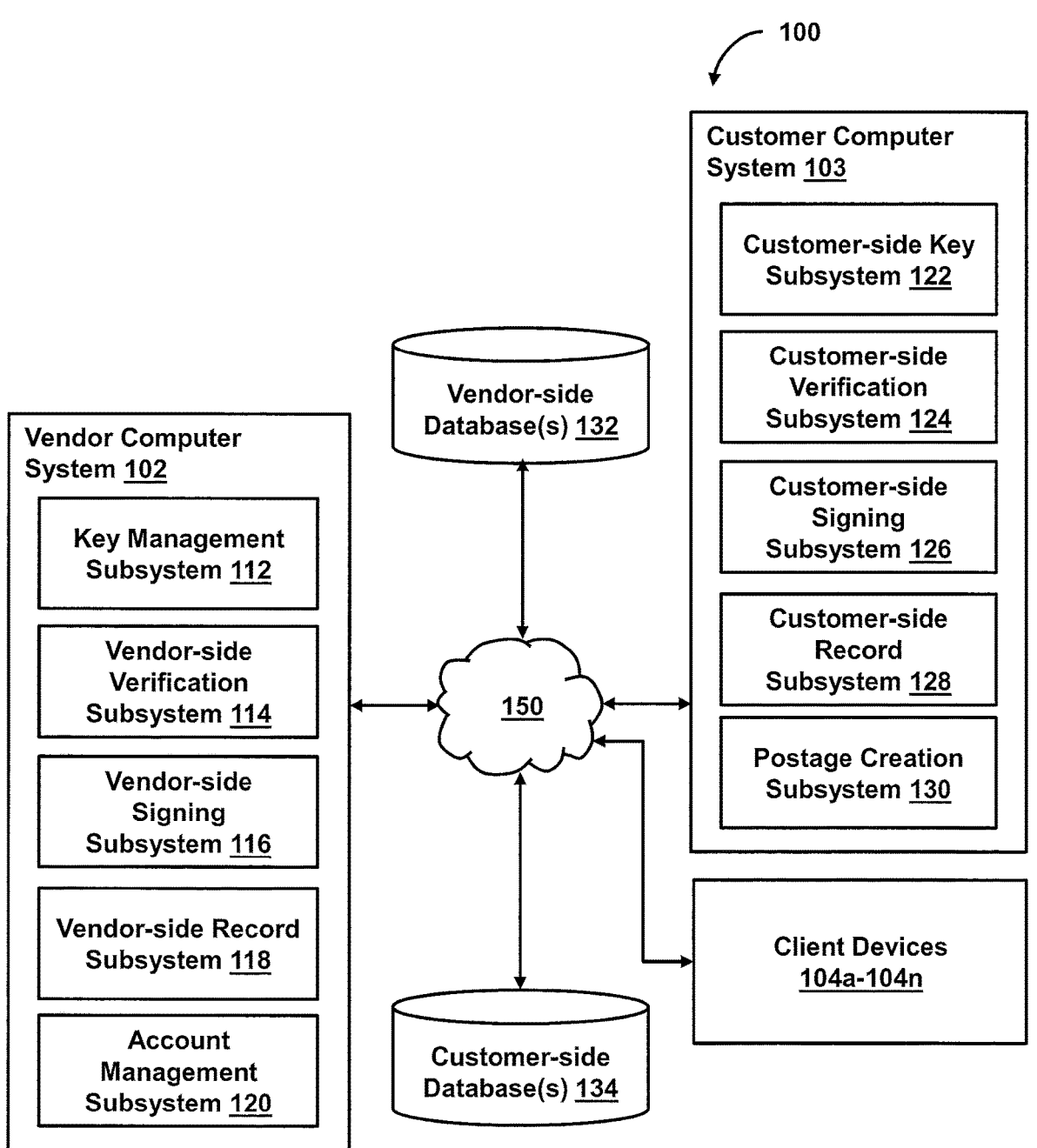
FIG. 1 shows a system for facilitating verification of postage transaction records, in accordance with one or more embodiments.

FIG. 1 shows a system 100 for facilitating verification of postage transaction records, in accordance with one or more embodiments. As discussed, traditional postage vendor computer systems of postage vendors for USPS or other postal carriers generally require that their customers' computer systems (e.g., merchants, shippers, or other entities) communicate with the vendor computer systems for each postage print transaction (or other postage transactions) to ensure the integrity of the postage transactions. Such a requirement, however, prevents or delays a print transaction from being completed in a number of circumstances, including, for example, when the vendor computer system is down, when network nodes between the vendor computer system and the customer computer system are down, when the connection between the two computer systems is limited in bandwidth, or other circumstances. Although the necessary assets for completing a print transaction (or other postage transaction) may be stored on the customer computer system to avoid postage transaction downtime or delay, such implementation without modifying the security measures of traditional vendor/customer computer systems may in some embodiments result in security issues, such as unauthorized manipulation of postage meters (e.g., if hosted at an otherwise traditional customer computer system), unauthorized creation of postage indicia and printing of labels thereof, tampering of postage transaction records, or other issues. As described herein, in some embodiments, system 100 may facilitate "cryptographic chaining" of postage transaction records (or other records) or cryptographic-chain-based verification of such records to address one or more of the foregoing or other issues.

As shown in FIG. 1, system 100 may include vendor computer system 102 (or systems 102), customer computer system 103 (or systems 103), client device 104 (or client devices 104a-104n), or other components. Vendor computer system 102 may include key management subsystem 112, vendor-side verification subsystem 114, vendor-side signing subsystem 116, vendor-side record subsystem 118, account management subsystem 120, or other components. Customer computer system 103 may include customer-side key subsystem 122, customer-side verification subsystem 124, customer-side signing subsystem 126, customer-side record subsystem 128, postage creation subsystem 130, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers (e.g., servers of computer systems 102 and 103), or other components of system 100.

It should be noted that, while one or more operations are described herein as being performed by particular components of computer systems 102 or 103, those operations may, in some embodiments, be performed by other components of computer system 102, computer system 103, or other components of system 100. As an example, while one or more operations are described herein as being performed by components of computer system 102, those operations may, in some embodiments, be performed by components of computer system 103 or components of client device 104. As an example, while one or more operations are described herein as being performed by components of computer system 103, those operations may, in some embodiments, be performed by components of computer system 102 or components of client device 104.

In some embodiments, a computer system of a first entity and a computer system of a second entity (e.g., first-entity computer system and second-entity computer system) may be utilized in lieu of vendor computer system 102 and customer computer system 103. As an example, one of vendor computer system 102 or customer computer system 103 may be instead a first-entity computer system, and the other one of vendor computer system 102 or customer computer system 103 may instead be a second-entity computer system. It should be noted that, although "vendor" public/private keys, digital signatures, etc., and "customer" public/private keys, digital signatures, etc., are described herein, "first-entity" public/private keys, digital signatures, etc., and "second-entity" public/private keys, digital signatures, etc., may be utilized in some embodiments in addition to or in lieu of such "vendor" and "customer" items. It should also be noted that, although digital signatures are utilized to facilitate data integrity in some embodiments, other cryptographic items (e.g., created based on a private key or via other techniques) may be utilized to facilitate data integrity in other embodiments.

In some embodiments, a first-entity computer system (e.g., customer computer system 103 associated with a customer of a vendor) and a second-entity computer system (e.g., vendor computer system 102 associated with the vendor) may establish one or more connections with one another to facilitate communication between the computer systems. One or more of the computer systems may initiate one or more challenge/response exchanges to authenticate the connections. In some embodiments, vendor computer system 102 may obtain a challenge response from customer computer system 103 via a connection between the two computer systems 102 and 103, and perform verification of the challenge response (e.g., via public-key-based verification, signature verification, certificate-based verification, or other techniques). As an example, vendor compute system 102 may present a question (e.g., the challenge) to which customer computer system 103 must provide a valid answer (e.g., the response). In one use case, the challenge-response protocol used by vendor computer system 102 may include password authentication, where the challenge is asking for the password and the valid response is the correct password. In another use case, the challenge-response protocol used by vendor computer system 102 may include the use of a cryptographic nonce as the challenge to ensure that every challenge-response sequence is unique (e.g., to protect against man-in-the-middle attacks, subsequent replay attacks, etc.). For example, a strong cryptographically secure pseudorandom number generator and cryptographic hash function can generate challenges that are highly unlikely to occur more than once.

Registration/Activation

In some embodiments, vendor computer system 102 (e.g., via key management subsystem 112) associated with a postage vendor (or other vendor) may create and store public/private key pairs associated with one or more customers during registration/activation of the customers with the vendor. The customer private keys for a given customer may be securely provided to customer computer system 103 associated with the customer (e.g., electronically via one or more secure connections over the Internet, via a physical dongle or storage item storing the private keys, registers, or other information, or via other techniques). In some embodiments, vendor computer system 102 (e.g., via key management subsystem 112) may provide a secret to customer computer system 103 associated with a customer (e.g., electronically via one or more secure connections over the Internet, via a physical dongle or storage item storing the secret, of via other techniques), and customer computer system 103 may create and stored one or more public/private key pairs.

In some embodiments, although the customer private keys may remain stored at customer computer system 103 (or also stored at vendor computer system 102, e.g., vendor computer system 102 created the private keys), the customer public keys may be provided to other entities (e.g., made publically available, made available to USPS or other postal carriers, etc.) to enable the other entities to verify information (e.g., signed with the customer private keys) sourced from customer computer system 103. In some embodiments, at least one of the customer public/private key pairs may include an indicia private key and an indicia public key respectively for signing postage indicia and verifying that the postage indicia is from the customer (e.g., by verifying the customer digital signature that was created via the signing of the postage indicia). In some embodiments, at least one of the customer public/private key pairs may include a file exchange private key and a file exchange public key for respectively for signing one or more files (e.g., representing a record) or other information and verifying that the files are from the customer.

In some embodiments, vendor computer system 102 may create one or more new public/private key pairs for a customer (e.g., a reseller of a postage vendor or other customer of the postage vendor) to replace one or more old public/private key pairs (e.g., new replacement indicia keys, new replacement file exchange keys, etc.). Vendor computer system 102 may cause the replaced public/private key pairs to be rendered void by updating one or more other systems with the new public/private key pairs for the customer (e.g., updating a USPS computer system, a La Poste computer system, other postal carrier's computer system, or other systems of third-parties with respect to the vendor associated with vendor computer system 102).

Transactions and Label Creation

In some embodiments, customer computer system 103 may facilitate one or more transactions (e.g., postage transaction or other transaction) and store the transactions as at least part of one or more transaction records (e.g., in customer-side database 132 or other storage). In some embodiments, customer computer system 103 may establish a connection with vendor computer system 102 to sync time with vendor computer system 102 on a periodic basis (e.g., every 72 hours or other periodic time period), in accordance to a schedule, based on other automated triggers causing the time sync, or in response to a user request for the time sync. In some embodiments, customer computer system 103 may upload the transaction records to vendor computer system 102 on a periodic basis, in accordance to a schedule, based on other automated triggers causing the record uploading, or in response to a user request for the record uploading (e.g., in conjunction with the cryptographic chaining or crypto-graphic-chaining-based verification operations described herein or with other operations).

In some embodiments, customer computer system 103 need not interact with vendor computer system 102 in order to complete one or more transactions, such as (i) printing of postage by a merchant, shipper, or other entity for delivering one or more items via a postal carrier or (ii) other transactions. As an example, with respect to a postage print transaction, customer computer system 103 may verify that the amount of the postage is within a customer's postage meter limit (e.g., the amount does not exceed the customer's total available balance, the customer's maximum single transaction threshold, the customer's maximum limit per/period, etc.). If the amount is within the postage meter limit, customer computer system 103 may decrease its descending register of its postage meter by the amount, increase its ascending register of the postage meter by the amount, and store corresponding information (e.g., the amount, transaction time, register values, or other information) associated with the print transaction as least part of a transaction record. In this way, if vendor computer system 102 is down, network nodes between the two computer systems 102 and 103 are down, etc., then customer computer system may complete a print transaction (or other transaction) without having to first communicate with vendor computer system 102.

In some embodiments, customer computer system 103 may establish a connection with vendor computer system 102 to complete a transaction (e.g., for every print transaction, for print transactions only when such a connection can readily be established and maintained, etc.). As an example, with respect to a postage print transaction, vendor computer system 102 may verify that the amount of the postage is within a customer's postage meter limit (e.g., the amount does not exceed the customer's total available balance, the customer's maximum single transaction threshold, the customer's maximum limit per/period, etc.). Vendor computer system 102 may approve the print transaction based on the amount of the postage being within the customer's postage meter limit (or based on other criteria), and return confirmation information and a vendor digital signature (for the confirmation information) to customer computer system 103. In one use case, the confirmation information may include the amount of the postage and a transaction time of the print transaction, and the vendor digital signature may be created based on (i) a vendor private key, (ii) the amount of the postage, (iii) the transaction time, and (iv) a customer public key (e.g., the customer's file exchange public key or other public key). For example, the vendor digital signature may be created by providing as inputs to a cryptographic function (i) the vendor private key as a signing key and (ii) the amount of the postage, the transaction time, and the customer public key as at least part of the combined content to be signed with the vendor private key. In response to the foregoing inputs, the cryptographic function may output the vendor digital signature.

In some embodiments, customer computer system 103 may verify confirmation information (obtained from vendor computer system 102) based on (i) a vendor digital signature for the confirmation information and (ii) a vendor public key (corresponding to a vendor private key used to create the vendor digital signature). If, for instance, the verification generates an output indicating that the confirmation information is valid (e.g., by verifying that the vendor digital signature is valid), customer computer system 103 may decrease its descending register of its postage meter by the amount of the postage, increase its ascending register of the postage meter by the amount of the postage, and store corresponding information (e.g., the amount of the postage, transaction time, register values, the vendor digital signature, or other information) associated with the print transaction as least part of a transaction record.

In some embodiments, customer computer system 103 may create one or more postage indicia (e.g., in response to a print transaction or other triggers). As an example, postage indicia may be created to include data corresponding to the following fields shown in Table 1 below, where "IBI" is Information-Based Indicia, "DD" is Data Dictionary, "PSD" is Postal Security Device, and "PO" is Post Office. In one use case, the postage indicia may be represented on a postage label as a barcode (e.g., one-dimensional barcode, two-dimensional barcode, or other representation).

TABLE 1

| Field Order in Indicia | IBI DD Field Reference Number | Field Length | Indicia Offset | Data Elements | Fixed Value |
|---|---|---|---|---|---|
| 1 | 11 | 1 | 0 | Indicia Version Number | [*] |
| 2 | 1 | 1 | 1 | Algorithm ID | [*] |
| 3 | 3 | 4 | 2 | Certificate Serial Number | [*] |
| 4 | 10 | 2 | 6 | IBI Vendor ID | [*] |
| 5 | 16 | 2 | 8 | PSD Model Number | [*] |
| 6 | 17 | 4 | 10 | PSD Serial Number | [*] |
| 7 | 2 | 5 | 14 | Ascending Register | [*] |
| 8 | 15 | 3 | 19 | Postage Value | [*] |
| 9 | 6 | 4 | 22 | Date of Mailing | [*] |
| 10 | 14 | 4 | 26 | Licensing PO Zip Code | [*] |
| 11 | 8 | 5 | 30 | Destination Zip Code | [*] |
| 12 | 26 | 6 | 35 | Software ID6 | [*] |
| 13 | 7 | 4 | 41 | Descending Register | [*] |
| 14 | 29 | 4 | 45 | Mail Category1 | [*] |
| 15 | 9 | 40 | 49 | Digital Signature | [*] |
| 16 | 34 | 2 | 89 | Piece Weight | [*] |
| 17 | 42 | 4 | 91 | Originating Zip Code | [*] |

In some embodiments, the postage indicia (or a label or other representation thereof) may be verified by verifying the postage indicia's digital signature (e.g., a customer digital signature created for the postage indicia based on the customer's indicia private key as the signing key). As an example, the verification may be performed by USPS (or other postal carrier delivering a mail item on which the postage label is affixed) or other entity by using the customer's indicia public key (corresponding to the indicia private key used as the signing key) and the same hashing function (used in the process of creating the digital signature) to determine whether the digital signature is valid. In some embodiments, customer computer system 103 need not interact with vendor computer system 102 for a specific transaction (e.g., print transaction or other transaction) in order to create the postage indicia for the transaction or a label representing the postage indicia. As an example, customer computer system 103 may use a postage indicium and pre-downloaded tracking number information (e.g., including USPS tracking numbers or tracking numbers of other postal carriers) to create a label without needing to connect to vendor computer system 103 with respect to specific transactions.

Record Chaining and Cryptographic-Chain-Based Record Verification

In some embodiments, system 100 may facilitate "cryptographic chaining" of postage transaction records (or other records) and cryptographic-chain-based verification of such records. In some embodiments, a first computer system (sending a record of one or more transactions to a second computer system) may create a new cryptographic item (e.g., a customer digital signature) related to the transaction record based on (i) a private key (e.g., stored in a secure local storage at the first computer system or other secure storage, associated with a first entity, etc.), (ii) the transaction record, and (iii) a cryptographic item (e.g., a prior vendor digital signature) previously derived from a prior transaction record sent from the first computer system (or the first entity associated therewith). In some embodiments, the first computer system may use the private key to create the new cryptographic item from the transaction record and the previously-derived cryptographic item. In one use case, the first computer system may provide as inputs to a cryptographic function (i) the private key as a signing key and (ii) the transaction record and the previously-derived cryptographic item as at least part of the combined content to be signed with the private key. In response to the foregoing inputs, the cryptographic function may output the new cryptographic item, which is derived from the private key, the transaction record, and the previously-derived cryptographic item. Upon the new cryptographic item being provided to the second computer system, the second computer system may perform verification of the transaction record (e.g., by verifying the new cryptographic item) by determining whether the new cryptographic item is "cryptographically chained" to a particular previously-created cryptographic item (e.g., the cryptographic item derived, by the second computer system, from the prior transaction record). If, for instance, it is determined that the new cryptographic item is "chained" to the previously-derived cryptographic item, the verification performed by the second computer system may indicate that the transaction record is valid. In this way, for example, the data integrity of transaction records may be protected and easily verifiable—other entities can use the known corresponding public keys to verify whether the postage transaction records have been compromised. In addition, because the transaction records are chained via their cryptographic items (e.g., digital signatures), a further layer of security is provided (e.g., if only the customer private key is compromised, an attacker or other such entity would still not be able to produce a valid customer digital signature without the correct prior vendor digital signature).

Figure 2:
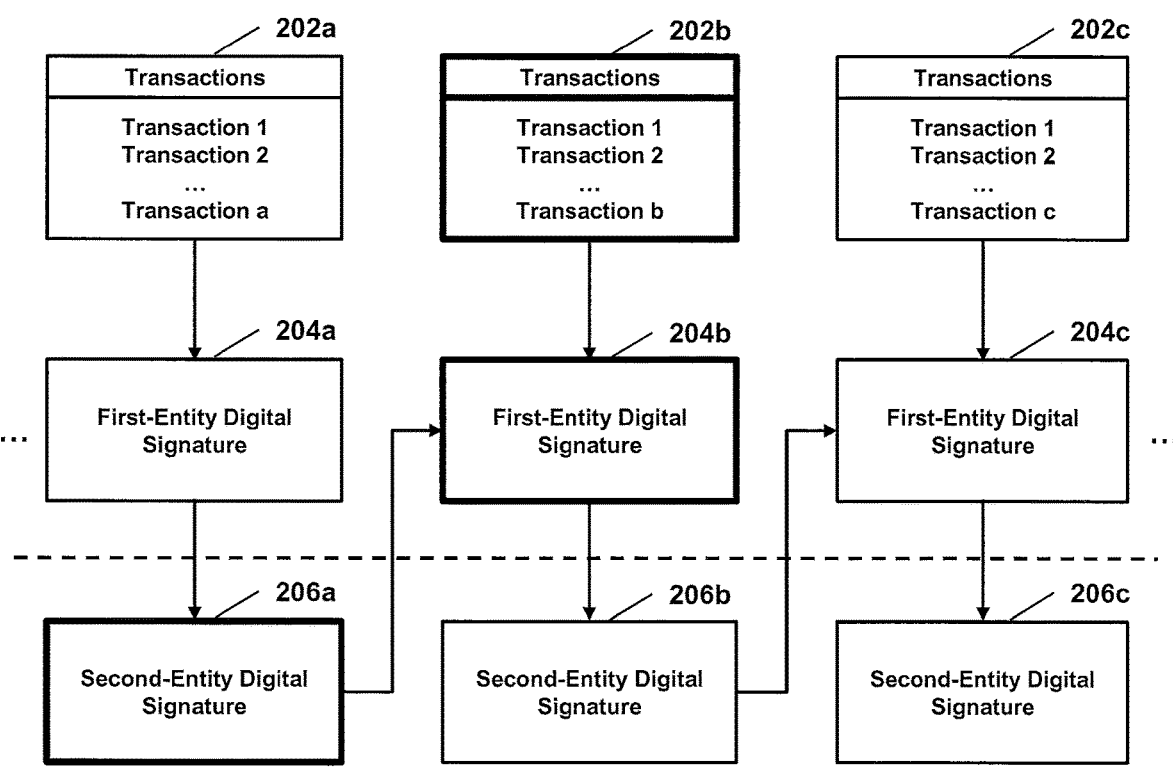
FIG. 2 illustrates a diagram depicting creation of cryptographically-related digital signatures, in accordance with one or more embodiments.

As an example, with respect to FIG. 2, a computer system associated with a first entity may combine at least a record (including information about one or more transactions) and a digital signature (a "second-entity digital signature") previously derived by a computer system associated with a second entity, and sign the combined information with a private key (a "first-entity private key") associated with the first entity to create a digital signature ("a first-entity digital signature") of the combined information. As such, the first-entity digital signature created by the first computer system is "cryptographically chained" to the previously-derived second-entity digital signature (e.g., as a result of the previously-derived second-entity digital signature being part of the combined information that was signed by the first-entity private key to create the first-entity digital signature). In this way, for example, the second-entity computer system may verify through the first-entity digital signature that (i) the transaction record was not compromised after it was sent from its source (e.g., by verifying that the first-entity private kay was used to sign the transaction record) and (ii) the first-entity private key was not stolen and thereafter used to create the first-entity digital signature (e.g., by verifying that the first-entity digital signature is a digital signature of a combination of at least the transaction record and the correct previously-derived second-entity digital signature). In some embodiments, the very first second-entity digital signature (e.g., an initial second-entity digital signature) may be zero or other initial value (e.g., generated based on the second entity's private key or via another technique). In some embodiments, the first entity is a customer of a postage vendor (e.g., a vendor for products/services of one or more postal carriers or other postage vendor), and the second entity is the postage vendor. In some embodiments, the first-entity computer system is a computer system associated with the customer, and the second-entity computer system is a computer system associated with the postage vendor, or vice versa.

In one scenario, also with respect to FIG. 2, the first-entity computer system may combine transaction record 202*b* and second-entity digital signature 206*a*, and sign the combined information (including transaction record 202*b* and second-entity digital signature 206*a*) with the first-entity private key to create first-entity digital signature 204*b*. The first-entity computer system may provide first-entity digital signature 204*b* (and transaction record 204*a*) to the second-entity computer system to allow the second-entity computer system to determine whether transaction record 202*b* is valid by using a first-entity public key (corresponding to the first-entity private key) to verify whether first-entity digital signature 204*b* is a valid digital signature of the combined information including (i) transaction record 202*b* and (ii) second-entity digital signature 206*a*. If the verification indicates that first-entity digital signature 204*b* is valid, transaction record 202*b* may be determined to be a valid transaction record.

In a further scenario, the second-entity computer system may create second-entity digital signature 206*b* and provide second-entity digital signature 206*b* to the first-entity computer system to allow the first-entity computer system to use second-entity digital signature 206*b* with a subsequent transaction record (e.g., a next transaction record or other subsequent transaction record) to create a subsequent first-entity digital signature (e.g., to "cryptographically chain" the subsequent first-entity digital signature with second-entity digital signature 206*b*). As an example, the first-entity computer system may combine transaction record 202*e* and second-entity digital signature 206*b*, and sign the combined information (including transaction record 202*c* and second-entity digital signature 206*b*) with the first-entity private key to create first-entity digital signature 204*c*. Upon first-entity digital signature 204*c* being provided to the second-entity computer system, the second-entity computer system may determine whether transaction record 202*e* is valid by using the first-entity public key (corresponding to the first-entity private key) to verify whether first-entity digital signature 204*c* is a valid digital signature of the combined information including (i) transaction record 2020 and (ii) second-entity digital signature 206*b*. If the verification indicates that first-entity digital signature 204*c* is valid, transaction record 202*c* may be determined to be a valid transaction record.

Customer-Side Subsystems

In some embodiments, customer-side key subsystem 122 may obtain a private key (a "customer private key") associated with a customer (e.g., of a postage vendor). Customer-side signing subsystem 126 may create a customer digital signature (for information to be signed) based on the private key. As an example, the customer private key may be obtained from a secure local storage at customer computer system 103 associated with the customer (e.g., a secure memory within a cryptographic processor of customer computer system 103 or other secure memory at customer computer system 103). In one use case, vendor computer system 102 (e.g., via key management subsystem 112) may create the customer private key and a corresponding public key as a public/private key pair associated with the customer. The customer private key may be provided to customer computer system 103 (e.g., electronically via one or more secure connections over the Internet, via a physical dongle or storage item storing the private key, or via other techniques). In another use case, customer-side key subsystem 122 and customer-side signing subsystem 126 may reside on a physical dongle or card (e.g., a physical cryptographic card) having a secure memory that includes the customer private key, one or more registers (e.g., a descending register), or other information. In yet another use case, vendor computer system 102 (e.g., via key management subsystem 112) may provide a secret to customer computer system 103 (e.g., electronically via one or more secure connections over the Internet, via a physical dongle or storage item storing the secret, or via other techniques), and customer-side key subsystem 122 may create the customer private and the corresponding public key based on the provided secret.

In some embodiments, customer-side record subsystem 128 may provide postage transaction records to vendor computer system 102 (e.g., associated with a postage vendor or other vendor). In one use case, a postage transaction record may be a single file that includes information regarding one or more postage transactions (e.g., 10 transactions, 100 transactions, 1000 transactions, or other number of transactions). In another use case, a postage transaction record may include multiple files, one or more of which may include information regarding postage transactions. Postage transactions may include purchase transactions, meter movements, label prints, meter resets, or other postage transactions. File content may include: (i) version of file format, (ii) file ID (e.g., sequence number), (iii) file generation time, (iv) provider ID, (v) model ID, (vi) PSD serial number (e.g., meter number), (vii) ascending register, (viii) descending register, (ix) piece count, (x) PSD status (e.g., unleased, leased, withdrawn, etc.), (xi) event code (e.g., authorize PSD, create indicium, reset, withdraw, reprint, etc.), (xii) event time, (xiii) provider customer ID (e.g., bridge user ID), (xiv) tracking number, (xv) full indicium data including its digital signature, (xvi) PSD physical address, (xvii) postage print record, or (xviii) other information.

In some embodiments, customer-side record subsystem 128 may establish a connection with vendor computer system 102 to (i) sync time with vendor computer system 102, (ii) upload one or more postage transaction records to vendor computer system 102, (iii) download pre-generated tracking numbers from vendor computer system 102 (e.g., to be stored for use in creating labels for specific transactions without needing to connect to vendor computer system 102), (iv) download any pending transactions (e.g., postage adjustments from USPS or other postal carriers, postage print transactions that has not been downloaded to customer computer system 103, etc.), or (iv) perform other actions. In some embodiments, customer-side record subsystem 128 may perform one or more of the foregoing actions on a periodic basis (e.g., every 72 hours or other periodic time period), in accordance to a schedule, based on other automated triggers causing the actions, or in response to a user request for the actions. In some embodiments, customer-side verification subsystem 124 perform verification of one or more of the foregoing items downloaded from vendor computer system 102 to ensure that the foregoing downloaded items has not been compromised (e.g., verifying that the foregoing download items was signed with the vendor's private key or via other techniques). In some embodiments, if a time sync is not properly performed between vendor computer system 102 and customer computer system 103 for at least a predetermined threshold amount of time (e.g., within 96 hours or other amount of time since the last time sync), the customer's account may be locked. The locking may include: (i) preventing the customer from uploading further transaction records to vendor computer system 102, (ii) voiding the customer's public key as a key for verifying the customer's digital signatures, or (iii) other disabling action until the lock has been reset (e.g., by reactivating the customer's account, creating a replacement public/private key pair for the customer, etc.).

In some embodiments, a first postage transaction record (including one or more transactions) may be provided to vendor computer system 102 at a given time, and a second postage transaction record (including one or more other transactions) may be provided to vendor computer system 102 subsequent to providing the first postage transaction record. In some embodiments, customer-side signing subsystem 126 may obtain (i) a private key associated with a customer, (ii) a first vendor digital signature derived from the first postage transaction record, (iii) the second postage transaction record, or (iv) other information. Customer-side signing subsystem 126 may create a customer digital signature based on the obtained information (e.g., where the customer digital signature may be used to verify data integrity of the second postage transaction record, verify that the second postage transaction record is from a trusted source, verifying that the source of the second postage transaction record has been recently validated, etc.). In some embodiments, vendor computer system 102 may have created the first vendor digital signature at a first time based on (i) a vendor private key associated with the postage vendor and (ii) a prior customer digital signature created at a second time prior to the first time, and provided the first vendor digital signature to customer computer system 103. As an example, the vendor private key may be used to sign at least the prior customer digital signature to create the first vendor digital signature at the first time. In one scenario, the signing of the prior customer digital signature may be performed by: (i) encrypting the prior customer digital signature based on the vendor private key to create the first vendor digital signature (e.g., such that the first vendor digital signature is an encrypted version, of the prior customer digital signature, which can be decrypted using a corresponding vendor public key) or (ii) encrypting a hash of at least the prior customer digital signature based on the vendor private key to create the first vendor digital signature (e.g., such that the first vendor digital signature is the encrypted hash, which can be decrypted using the vendor public key).

In some embodiments, customer-side signing subsystem 126 may create a customer digital signature based on (i) a private key associated with a customer, (ii) a first vendor digital signature derived from a first postage transaction record, (iii) a second postage transaction record, or (iv) other information. Computer-side record subsystem 128 may provide the customer digital signature to vendor computer system 102. In some embodiments, computer-side record subsystem 128 may obtain a second vendor digital signature from vendor computer system 102 (e.g., responsive to providing the customer digital signature to vendor computer system 102, responsive to providing the second transaction record, etc.). Computer-side record subsystem 128 may cause the second vendor digital signature to be stored (e.g., in a secure local storage or other storage) so that the second vendor digital may later be obtained and used with a subsequent transaction record (e.g., a next transaction record or other subsequent transaction record) to create a subsequent customer digital signature (e.g., to "cryptographically chain" the subsequent customer digital signature with the second vendor digital signature).

In some embodiments, customer-side verification subsystem 124 may perform verification of the second vendor digital signature (obtained from vendor computer system 102) based on a vendor public key (corresponding to the vendor private key). Based on the verification indicating that the second vendor digital signature is valid, customer-side signing subsystem 126 may store the second vendor digital signature at customer computer system 103 in association with a subsequent postage transaction record (e.g., a next transaction postage record or other subsequent transaction record). In some embodiments (e.g., where at least the customer digital signature provided to vendor computer 102 is hashed as part of the process to create the second vendor digital signature), the verification of the second vendor digital may include hashing at least the customer digital signature to create a reference hash (e.g., using the same hash function used to create the second vendor digital signature). In some embodiments (e.g., where at least the second transaction record provided to vendor computer system 102 is hashed as part of the process to create the second vendor digital signature), the verification of the second vendor digital may include hashing at least the second transaction record to create the reference hash. In some embodiments, the verification of the second vendor digital may include: (i) decrypting the second vendor digital signature based on the vendor public key to create a decrypted version of the second vendor digital signature and (ii) determining whether the reference hash matches the decrypted version of the second vendor digital signature. If, for instance, the reference hash matches the decrypted version of the second vendor digital signature, the verification may generate an output indicating that the second vendor digital signature is valid.

In some embodiments, customer-side signing subsystem 126 may create a customer digital signature for a postage transaction record by signing at least the postage transaction record based on a private key associated with a customer (e.g., a customer of a postage vendor or other customer). In some embodiments, customer-side signing subsystem 126 may create a customer digital signature by combining at least (i) a first vendor digital signature derived from a first postage transaction and (ii) a second postage transaction record, and use a private key associated with a customer to sign the combined information (including the first vendor digital signature and the second postage transaction record) to create the customer digital signature. In some embodiments, customer-side signing subsystem 126 may perform the signing by (i) hashing at least the combined information to create a hash of the combined information and (ii) encrypting the hash of the combined information based on the customer private key to create the customer digital signature.

In some embodiments, postage creation subsystem 130 may facilitate one or more transactions, such as (i) printing of postage by a merchant, shipper, or other entity for delivering one or more items via a postal carrier or (ii) other transactions. In some embodiments, postage creation subsystem 130 may verify that the amount of the postage is within a customer's postage meter limit (e.g., the amount of the postage does not exceed the customer's total available balance, the customer's maximum single transaction threshold, the customer's maximum limit per/period, etc.). In some embodiments, postage creation subsystem 130 may establish a connection with vendor computer system 102 to complete a transaction. As an example, with respect to a postage print transaction, vendor computer system 102 may verify that the amount of the postage is within a customer's postage meter limit (e.g., the amount of the postage does not exceed the customer's total available balance, the customer's maximum single transaction threshold, the customer's maximum limit per/period, etc.). Vendor computer system 102 may approve the print transaction based on the amount being within the customer's postage meter limit (or based on other criteria), and return confirmation information and a vendor digital signature (for the confirmation information) to postage creation subsystem 130. In some embodiments, postage creation subsystem 130 may create one or more postage indicia (e.g., in response to a print transaction or other triggers). In some embodiments, postage creation subsystem 130 may use a postage indicium and pre-downloaded tracking number information (e.g., including USPS tracking numbers or tracking numbers of other postal carriers) to create a label without needing to connect to vendor computer system 103 with respect to specific transactions.

Vendor-Side Subsystems

In some embodiments, vendor-side record subsystem 118 may obtain one or more customer digital signatures from customer computer system 103. As an example, a customer digital signature (obtained from customer computer system 103) may be based on (i) a customer private key associated with a customer (e.g., a customer of a postage vendor or other vendor), (ii) a postage transaction record, and (iii) a prior vendor digital signature. In one use case, customer computer system 103 may provide as inputs to a cryptographic function (i) the customer private key as a signing key and (ii) the transaction record and the prior vendor digital signature as at least part of the combined content to be signed with the customer private key. In response to the foregoing inputs, the cryptographic function may output the customer digital signature (e.g., derived from the customer private key, the transaction record, and the prior vendor digital signature).

In some embodiments, vendor-side record subsystem 128 may obtain a first customer digital signature from customer computer system 103, where the first customer digital signature is based on (i) a customer private key associated with a customer, (ii) a first postage transaction record, and (iii) a prior vendor digital signature. Vendor-side verification subsystem 124 may perform verification of the first customer digital signature based on a customer public key (corresponding to the customer private key). Vendor-side signing subsystem 126 may create a first vendor digital signature and provide the first vendor digital signature to customer computer system 103. As an example, the first vendor digital signature may be created based on (i) the verification indicating that the first customer digital signature is valid, (ii) a vendor private key associated with a postage vendor (or other vendor), and (iii) the first customer digital signature. In some embodiments, the verification of the first customer digital signature may include: (i) hashing at least the first postage transaction record and the prior vendor digital signature to create a reference hash, (ii) decrypting the first customer digital signature based on the customer public key to create a decrypted version of the first customer digital signature, and (iii) determining whether the reference hash matches the decrypted version of the first customer digital signature. If, for instance, the reference hash matches the decrypted version of the first customer digital signature, the verification may generate an output indicating that the first customer digital signature is valid.

In some embodiments, vendor-side signing subsystem 126 may create a first vendor digital signature and provide the first vendor digital signature to customer computer system 103 responsive to: (i) obtaining a first customer digital signature from customer computer system 103, (ii) obtaining a first transaction record (to which the first customer digital signature corresponds) from customer computer system 103, or (iii) other triggers. In some embodiments, vendor-side record subsystem 128 may obtain a second customer digital signature from customer computer system 103 (e.g., responsive to providing the first vendor digital signature to customer computer system 103 or providing other information thereto). As an example, the second customer digital signature (obtained from customer computer system 103) may be based on (i) the customer private key, (ii) a second postage transaction record, and (iii) the first vendor digital signature. As an example, the first vendor digital signature may be used by customer computer system 103 to create the second customer digital signature based on a verification of the first vendor digital signature indicating that the first vendor digital signature is valid.

In some embodiments, account management subsystem 120 may detect whether a time sync has occurred between vendor computer system 102 and customer computer system 103 within a predetermined time threshold of amount (e.g., within 96 hours or other amount of time since the last time sync). In some embodiments, if it is detected that time sync has not properly been performed between vendor computer system 102 and customer computer system 103 for at least the predetermined threshold amount of time, account management subsystem 120 may lock the customer's account. The locking may include: (i) preventing the customer from uploading further transaction records to vendor computer system 102, (ii) voiding the customer's public key as a key for verifying the customer's digital signatures, or (iii) other disabling action until the lock has been reset (e.g., by reactivating the customer's account, creating a replacement public/private key pair for the customer, etc.). In some embodiments, if verification of a customer's digital signature (provided to vendor computer system 102) indicates that the customer's digital signature is an invalid digital signature (e.g., as a result of a man-in-the-middle attack, an error by customer computer system 103, etc.), account management subsystem 120 may lock the customer's account in accordance with one or more locking techniques (e.g., as described herein or other locking techniques).

In some embodiments, account management subsystem 120 may facilitate one or more transactions, such as (i) a customer's purchase of postage from a postage vendor (e.g., to increase the customer's total available balance for printing postage), (ii) purchase of account upgrades (e.g., to increase the customer's maximum single transaction threshold, to increase the customer's maximum limit per/period, etc.), or other transactions. In some embodiments, vendor-side record subsystem may obtain, from customer computer system 103 (e.g., customer-side record subsystem 128), a transaction record indicating a request for (i) purchase of postage from the postage vendor, (ii) purchase of one or more account upgrades from the postage vendor, or (iii) other purchases (e.g., from the postage vendor or other entity). In addition to the transaction record, vendor-side record subsystem 118 may obtain a customer digital signature (associated with the transaction record) from customer computer system 103, where the customer digital signature is based on (i) a customer private key associated with a customer, (ii) the transaction record, and (iii) a prior vendor digital signature. Vendor-side verification subsystem 124 may perform verification of the customer digital signature based on a customer public key (corresponding to the customer private key) (e.g., via the verification techniques described herein or other techniques). Based on the verification indicating that the customer digital signature is valid, account management subsystem 120 may approve the indicated request in the transaction record (e.g., the postage purchase request, the account upgrade purchase request, etc.). In some embodiments, vendor-side signing subsystem 126 may create a vendor digital signature and provide the vendor digital signature to customer computer system 103. In this way, for example, customer computer system 103 (and/or other systems) may utilize the vendor digital signature as proof of the approval of the indicated request in the transaction record.

Examples Flowcharts

FIGS. 3 and 4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of facilitating cryptographic-chain-based verification of postage transaction records, in accordance with one or more embodiments. In an operation 302, a customer private key associated with a customer (e.g., a customer of a postage vendor or other customer) may be obtained from a secure local storage at a customer computer system associated with the customer. As an example, the private key may be stored in a secure memory within a cryptographic processor of the customer computer system or other secure memory at the customer computer system. Operation 302 may be performed by a subsystem that is the same as or similar to customer-side key subsystem 122, in accordance with one or more embodiments.

In an operation 304, (i) a first vendor digital signature derived from a first postage transaction record and (ii) a second postage transaction record may be obtained (e.g., from a database of the customer computer system, a vendor computer system, or other source). As an example, the first vendor digital signature may have been created at a first time based on (i) a vendor private key associated with the postage vendor and (ii) a prior customer digital signature created at a second time prior to the first time. In a further use case, the prior customer digital signature may be created based on (i) the customer private key, (ii) the first postage transaction record, and (iii) a prior vendor digital signature. In another use case, the prior customer digital signature may be created by combining at least the first postage transaction record and the prior vendor digital signature, and using the customer private key to sign the combined information (including the first postage transaction record and the prior vendor digital signature). In yet another use case, the prior customer digital signature may be created (via the signing) by hashing the combined information to create a hash of the combined information, and encrypting the hash of the combined information based on the customer private key to create the prior customer digital signature. Operation 304 may be performed by a subsystem that is the same as of similar to customer-side signing subsystem 126, in accordance with one or more embodiments.

In an operation 306, a customer digital signature may be created based on (i) the customer private key, (ii) the first vendor digital signature (derived from the first postal transaction record), and (iii) the second postage transaction record. As an example, the customer digital signature may be created by combining at least the second postage transaction record and the first vendor digital signature, and using the customer private key to sign the combined information (including at least the second postage transaction record and the first vendor digital signature). As a further example, the customer digital signature may be created (via the signing) by hashing the combined information to create a hash of the combined information, and encrypting the hash of the combined information based on the customer private key to create the prior customer digital signature. Operation 306 may be performed by a subsystem that is the same as or similar to customer-side signing subsystem 126, in accordance with one or more embodiments.

In an operation 308, the customer digital signature may be provided to a vendor computer system associated with the postage vendor. As an example, the customer digital signature may be provided along with the second transaction record for use in verifying that the second transaction record is a valid record from the customer (e.g., by verifying that the customer digital signature is a valid signature). As a further example, the first vendor digital signature may be used by the vendor computer system for verification of the second transaction record, as further described herein elsewhere. In one scenario, the first vendor digital signature may be provided to the vendor computer system along with the customer digital customer and the second transaction record. In another scenario, the vendor computer system may obtain the first vendor digital signature via another source (e.g., vendor-side database 132 or other source). Operation 308 may be performed by a subsystem that is the same as or similar to customer-side record subsystem 128, in accordance with one or more embodiments.

In an operation 310, a second vendor digital signature may be obtained from the vendor computer system. As an example, the second vendor digital signature may be obtained from the vendor computer system responsive to providing the customer digital signature (to the vendor computer system). The second vendor digital signature may be based on (i) a vendor private key associated with the postage vendor and (ii) the customer digital signature. Operation 310 may be performed by a subsystem that is the same as or similar to customer-side record subsystem 128, in accordance with one or more embodiments.

In an operation 312, verification of the second vendor digital signature (obtained from the vendor computer system) may be performed based on a vendor public key corresponding to the vendor private key. As an example, the verification of the second vendor digital signature may include: (i) hashing at least the customer digital signature to create a reference hash, (ii) decrypting the second vendor digital signature based on the vendor public key to create a decrypted version of the second vendor digital signature, and (iii) determining whether the reference hash matches the decrypted version of the second vendor digital signature. If, for instance, the reference hash matches the decrypted version of the second vendor digital signature (e.g., they are the same or otherwise matches), the verification may generate an output indicating that the second vendor digital signature is valid. Operation 312 may be performed by a subsystem that is the same as or similar to customer-side verification subsystem 124, in accordance with one or more embodiments.

In an operation 314, the second vendor digital signature may be caused to be stored at the customer computer system in association with a next postage transaction record. As an example, the second vendor digital signature may be stored in association with a next postage transaction record based on the verification indicating that the second vendor digital signature is valid. Operation 314 may be performed by a subsystem that is the same as or similar to customer-side signing subsystem 126, in accordance with one or more embodiments.

FIG. 4 shows a flowchart of a method 400 of facilitating cryptographic-chain-based verification of postage transaction records, in accordance with one or more embodiments. In an operation 402, a first customer digital signature may be obtained from a customer computer system. As an example, the first customer digital signature may be based on (i) a customer private key stored in a secure local memory at the customer computer system, (ii) a first postage transaction record, and (iii) a prior vendor digital signature. As another example, the first customer digital signature may be obtained from the customer computer system along with the first postage transaction record. As a further example, the first digital signature and the first postage transaction record may be obtained from the customer computer system along with the prior vendor digital signature or other information. Operation 402 may be performed by a subsystem that is the same as or similar to vendor-side record subsystem 118, in accordance with one or more embodiments.

In an operation 404, verification of the first customer digital signature (obtained from the customer computer system) may be performed based on a customer public key corresponding to the customer private key. As an example, verification of the first customer digital signature may include: (i) hashing at least the first postage transaction record and the prior vendor digital signature to create a reference hash, (ii) decrypting the first customer digital signature based on the customer public key to create a decrypted version of the first customer digital signature, and (iii) determining whether the reference hash matches the decrypted version of the first customer digital signature. If, for instance, the reference hash matches the decrypted version of the first customer digital signature (e.g., they are the same or otherwise matches), the verification may generate an output indicating that the first customer digital signature is valid. Operation 404 may be performed by a subsystem that is the same as or similar to vendor-side verification subsystem 114, in accordance with one or more embodiments.

In an operation 406, a first vendor digital signature may be created based on (i) the verification indicating that the first customer digital signature is valid, (ii) a vendor private key associated with the postage vendor, and (iii) the first customer digital signature. As an example, the first vendor digital signature may be created by using the customer private key to sign at least the first customer digital signature (e.g., such that the first vendor digital signature represents a signature of only the first customer digital signature, the first vendor digital signature represents a signature of a combination of the first customer digital signature and other information, etc.). As another example, the first vendor digital signature may be created (via the signing) by encrypting the first customer digital signature or (ii) encrypting a hash of at least the first customer digital signature. As a further example, the first vendor digital signature may be created (via the signing) by combining at least the first customer digital signature and other information, hashing the combined information (including the first customer digital signature and the other information) to create a hash of the combined information, and encrypting the hash of the combined information based on the vendor private key to create the first vendor digital signature. Operation 406 may be performed by a subsystem that is the same as or similar to vendor-side signing subsystem 116, in accordance with one or more embodiments.

In an operation 408, the first vendor digital signature may be provided to the customer computer system. Operation 408 may be performed by a subsystem that is the same as or similar to vendor-side record subsystem 118, in accordance with one or more embodiments.

In an operation 410, a second customer digital signature may be obtained from the customer computer system. As an example, the second customer digital signature may be based on (i) the customer private key, (ii) a second postage transaction record, and (iii) the first vendor digital signature. As another example, the second customer digital signature may be obtained from the customer computer system along with the second postage transaction record. As a further example, the first digital signature and the first postage transaction record may be obtained from the customer computer system along with the prior vendor digital signature or other information. Operation 410 may be performed by a subsystem that is the same as or similar to vendor-side record subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., vendor-side database(s) 132, customer-side database(s) 134, or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, Wifi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or 122-130 or other subsystems. The processors may be programmed to execute computer program instructions by software, hardware; firmware; some combination of software, hardware, or firmware; and/or other mechanisms for configuring processing capabilities on the processors.

It should be appreciated that the description of the functionality provided by the different subsystems 112-120 or 122-130 described herein is for illustrative purposes, and is not intended to be limiting, as any of subsystems 112-120 or 122-130 may provide more or less functionality than is described. For example, one or more of subsystems 112-120 or 122-130 may be eliminated, and some or all of its functionality may be provided by other ones of subsystems 112-120 or 122-130. As another example, additional subsystems may be programmed to perform some or all of the functionality attributed herein to one of subsystems 112-120 or 122-130.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining a customer private key associated with a customer from a secure local storage at a customer computer system; obtaining (i) a first vendor digital signature derived from a first postage transaction record and (ii) a second postage transaction record; creating a customer digital signature based on (i) the customer private key, (ii) the first vendor digital signature, and (iii) the second postage transaction record; providing the customer digital signature to a vendor computer system associated with a postage vendor; and responsive to providing the customer digital signature, obtaining a second vendor digital signature from the vendor computer system, the second vendor digital signature being based on (i) a vendor private key associated with the postage vendor and (ii) the customer digital signature.

2. The method of embodiment 1, wherein the first vendor digital signature is created at a first time based on (i) a vendor private key associated with the postage vendor and (ii) a prior customer digital signature created at a second time prior to the first time.

3. The method of embodiment 2, further comprising: creating the prior customer digital signature based on (i) the customer private key, (ii) the first postage transaction record, and (iii) a prior vendor digital signature.

4. The method of embodiment 3, further comprising: prior to the second time, creating combined first information based on (i) the first postage transaction record and (ii) a prior vendor digital signature; and wherein creating the prior customer digital signature comprises using the customer private key to sign the combined first information to create the prior customer digital signature.

5. The method of embodiments 3 or 4, wherein creating the prior customer digital signature comprises: hashing at least the combined first information to create the first hash; and encrypting the first hash based on the customer private key to create the prior customer digital signature.

6. The method of any of embodiments 2-5, wherein the vendor private key is used to sign at least the prior customer digital signature to create the first vendor digital signature at the first time.

7. The method of embodiment 6, wherein the signing of the prior customer digital signature is performed by (i) encrypting the prior customer digital signature based on the vendor private key or (ii) encrypting a hash of at least the prior customer digital signature based on the vendor private key.

8. The method of any of embodiments 1-7, further comprising: performing, based on a vendor public key corresponding to the vendor private key, verification of the second vendor digital signature obtained from the vendor computer system; and causing, based on the verification indicating that the second vendor digital signature is valid, the second vendor digital signature to be stored at the customer computer system in association with a next postage transaction record.

9. The method of embodiment 8, wherein performing the verification of the second vendor digital signature comprises: hashing at least the customer digital signature to create a reference hash; decrypting the second vendor digital signature based on the vendor public key to create a decrypted version of the second vendor digital signature; and determining whether the reference hash matches the decrypted version of the second vendor digital signature, the verification indicating that the second vendor digital signature is valid based on the reference hash matching the decrypted version of the second vendor digital signature.

10. The method of any of embodiments 1-9, wherein the postage vendor is a vendor for one or more postal carriers.

11. A method comprising: obtaining a first customer digital signature from a customer computer system, the first customer digital signature being based on (i) a customer private key stored in a secure local storage at the customer computer system, (ii) a first postage transaction record, and (iii) a prior vendor digital signature; performing, based on a customer public key corresponding to the customer private key, verification of the first customer digital signature obtained from the customer computer system; creating a first vendor digital signature based on (i) the verification indicating that the first customer digital signature is valid, (ii) a vendor private key associated with the postage vendor, and (iii) the first customer digital signature; providing the first vendor digital signature to the customer computer system; and obtaining a second customer digital signature from the customer computer system, the second customer digital signature being based on (i) the customer private key, (ii) a second postage transaction record, and (iii) the first vendor digital signature.

12. The method of embodiment 11, wherein performing the verification of the first customer digital signature comprises: hashing at least the first postage transaction record and the prior vendor digital signature to create a reference hash; decrypting the first customer digital signature based on the customer public key to create a decrypted version of the first customer digital signature; and determining whether the reference hash matches the decrypted version of the first customer digital signature, the verification indicating that the first customer digital signature is valid based on the reference hash matching the decrypted version of the first customer digital signature.

13. The method of embodiments 11 or 12, wherein the first vendor digital signature is used by the customer computer system to create the second customer digital signature based on the customer computer system's verification of the first vendor digital signature indicating that the first vendor digital signature is valid.

14. The method of any of embodiments 11-13, wherein the postage vendor is a vendor for one or more postal carriers.

15. A tangible, non-transitory, machine-readable medium storing instructions that when executed by a data processing apparatus cause the data processing apparatus to perform operations comprising those of any of embodiments 1-14.

16. A system, comprising: one or more processors; and memory storing instructions that when executed by the processors cause the processors to effectuate operations comprising those of any of embodiments 1-14.

What is claimed is:

1. A method of facilitating a cryptographic-chain-based verification of postage transaction records, the method being implemented by a customer computer system associated with a customer of a postage vendor, the customer computer system comprising one of more processors executing computer program instructions that, when executed, perform the method, the method comprising:

obtaining a customer private key associated with the customer from a secure local storage at the customer computer system;

obtaining a first vendor digital signature derived from a first postage transaction record and a second postage transaction record;

creating a customer digital signature based on the customer private key, the first vendor digital signature, and the second postage transaction record;

providing the customer digital signature to a vendor computer system associated with the postage vendor; and responsive to the providing the customer digital signature, obtaining a second vendor digital signature from the vendor computer system, the second vendor digital signature being based on a vendor private key associated with the postage vendor and the customer digital signature.

2. The method of claim 1, wherein the first vendor digital signature is created at a first time based on the vendor private key associated with the postage vendor and a prior customer digital signature created at a second time prior to the first time.

3. The method of claim 2, further comprising:

creating the prior customer digital signature based on the customer private key, the first postage transaction record, and a prior vendor digital signature.

4. The method of claim 3, further comprising:

prior to the second time, creating combined first information based on the first postage transaction record and the prior vendor digital signature; and wherein the creating the prior customer digital signature comprises using the customer private key to sign the combined first information to create the prior customer digital signature.

5. The method of claim 4, wherein the creating the prior customer digital signature comprises:

hashing at least the combined first information to create a first hash; and encrypting the first hash based on the customer private key to create the prior customer digital signature.

6. The method of claim 2, wherein the vendor private key is used to sign at least the prior customer digital signature to create the first vendor digital signature at the first time.

7. The method of claim 6, wherein the signing of the prior customer digital signature is performed by encrypting the prior customer digital signature based on the vendor private key or encrypting a hash of at least the prior customer digital signature based on the vendor private key.

8. The method of claim 1, further comprising:

performing, based on a vendor public key corresponding to the vendor private key, a verification of the second vendor digital signature obtained from the vendor computer system; and causing, based on the verification indicating that the second vendor digital signature is valid, the second vendor digital signature to be stored at the customer computer system in association with a next postage transaction record.

9. The method of claim 8, wherein the performing the verification of the second vendor digital signature comprises:

hashing at least the customer digital signature to create a reference hash;

decrypting the second vendor digital signature based on the vendor public key to create a decrypted version of the second vendor digital signature; and determining whether the reference hash matches the decrypted version of the second vendor digital signature, the verification indicating that the second vendor digital signature is valid based on the reference hash matching the decrypted version of the second vendor digital signature.

10. The method of claim 1, wherein the postage vendor is a vendor for one or more postal carriers.

11. A system for facilitating cryptographic-chain-based verification of postage transaction records, the system comprising:

a customer computer system that comprises one or more processors programmed with computer program instructions that, when executed, cause the customer computer system to:

obtain a customer private key associated with a customer from a secure local storage at the customer computer system;

obtain a first vendor digital signature derived from a first postage transaction record and a second postage transaction record;

create a customer digital signature based on the customer private key, the first vendor digital signature, and the second postage transaction record;

provide the customer digital signature to a vendor computer system associated with the postage vendor; and responsive to providing the customer digital signature, obtain a second vendor digital signature from the vendor computer system, the second vendor digital signature being based on a vendor private key associated with the postage vendor and the customer digital signature.

12. The system of claim 11, wherein the first vendor digital signature is created at a first time based on the vendor private key associated with the postage vendor and a prior customer digital signature created at a second time prior to the first time.

13. The system of claim 12, wherein the vendor private key is used to sign at least the prior customer digital signature to create the first vendor digital signature at the first time.

14. The system of claim 13, wherein the signing of the prior customer digital signature is performed by encrypting the prior customer digital signature based on the vendor private key or encrypting a hash of at least the prior customer digital signature based on the vendor private key.

15. The system of claim 11, wherein the customer computer system is further caused to:

perform, based on a vendor public key corresponding to the vendor private key, a verification of the second vendor digital signature obtained from the vendor computer system; and cause, based on the verification indicating that the second vendor digital signature is valid, the second vendor digital signature to be stored at the customer computer system in association with a next postage transaction record.

16. The system of claim 15, wherein the performing the verification of the second vendor digital signature comprises:

hashing at least the customer digital signature to create a reference hash;

decrypting the second vendor digital signature based on the vendor public key to create a decrypted version of the second vendor digital signature; and determining whether the reference hash matches the decrypted version of the second vendor digital signature, the verification indicating that the second vendor digital signature is valid based on the reference hash matching the decrypted version of the second vendor digital signature.

17. A non-transitory computer-readable medium storing instructions which, when executed by a customer processing system associated with a customer including at least one processor, cause the customer processing system to perform operations, the operations comprising:

obtaining a customer private key associated with the customer from a secure local storage at the customer computer system;

obtaining a first vendor digital signature derived from a first postage transaction record and a second postage transaction record;

creating a customer digital signature based on the customer private key, the first vendor digital signature, and the second postage transaction record;

providing the customer digital signature to a vendor computer system associated with a postage vendor; and responsive to the providing the customer digital signature, obtaining a second vendor digital signature from the vendor computer system, the second vendor digital signature being based on a vendor private key associated with the postage vendor and the customer digital signature.

18. The non-transitory computer-readable medium of claim 17, wherein the first vendor digital signature is created at a first time based on the vendor private key associated with the postage vendor and a prior customer digital signature created at a second time prior to the first time.

19. The non-transitory computer-readable medium of claim 18, the operations further comprising:

creating the prior customer digital signature based on the customer private key, the first postage transaction record, and a prior vendor digital signature.

20. The non-transitory computer-readable medium of claim 19, further comprising:

prior to the second time, creating combined first information based on the first postage transaction record and the prior vendor digital signature; and wherein the creating the prior customer digital signature comprises using the customer private key to sign the combined first information to create the prior customer digital signature.

* * * * *